United States Patent [19]

Austin

[11] Patent Number: 4,717,237
[45] Date of Patent: Jan. 5, 1988

[54] OVERHEAD ELECTRIC AND OPTICAL TRANSMISSION SYSTEMS

[76] Inventor: Kenneth A. Austin, Ifold, West Sussex, England

[21] Appl. No.: 779,530

[22] Filed: Sep. 24, 1985

[30] Foreign Application Priority Data

Sep. 28, 1984 [GB] United Kingdom ............. 8424584

[51] Int. Cl.⁴ .................... G02B 6/44; H02G 7/00
[52] U.S. Cl. ........................ 350/96.23; 174/70 A
[58] Field of Search ............. 174/70 A, 70 R, 113 C, 174/113 R, 116; 350/96.15, 96.20, 96.23

[56] References Cited

U.S. PATENT DOCUMENTS 4,610,033  9/1986  Fox, Jr. .......................... 350/96.23

FOREIGN PATENT DOCUMENTS

| 0137244 | 4/1985 | European Pat. Off. | |
| 2733607 | 2/1979 | Fed. Rep. of Germany | 350/96.23 |
| 2051399 | 1/1981 | United Kingdom | 350/96.23 |
| 2074753 | 11/1981 | United Kingdom | |
| 2083647 | 2/1982 | United Kingdom | |
| 2101351 | 1/1983 | United Kingdom | |
| 2132788 | 7/1984 | United Kingdom | |
| 2115621 | 10/1985 | United Kingdom | |

Primary Examiner—Eugene R. LaRoche
Assistant Examiner—Steven J. Mottola
Attorney, Agent, or Firm—Buell, Ziesenheim, Beck & Alstadt

[57] ABSTRACT

In an overhead electric and optical transmission system in which at least one of the overhead electric conductors incorporates an optical guide, the overhead electric conductor is mechanically secured to a tower or other rigid support structure by a mechanical connection in which an end of the overhead electric conductor is mechanically secured to and is electrically insulated from the tower or other rigid support structure by an elongate tension insulator having at least one throughbore, the optical guide of the conductor passes from the conductor through the throughbore of the tension insulator to an optical guide joint remote from the insulator, and the electric conductor is electrically connected to another electric conductor. The tension insulator may be a shedded body of porcelain or glass having a central throughbore or it may be a rod or tube of resin bonded glass fibre surrounded by a shedded sleeve of plastics material having at least one throughbore extending throughout the length of the wall of the sleeve.

11 Claims, 4 Drawing Figures

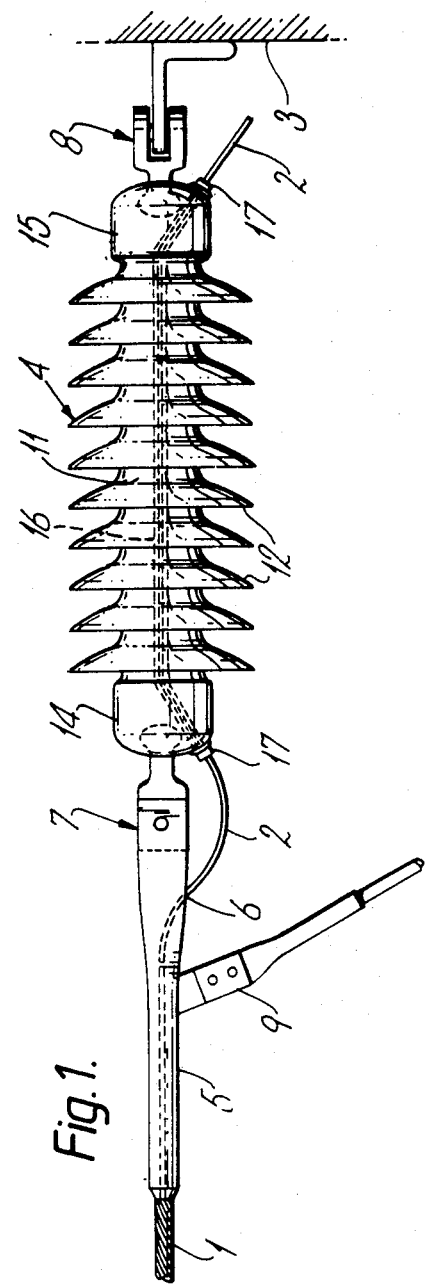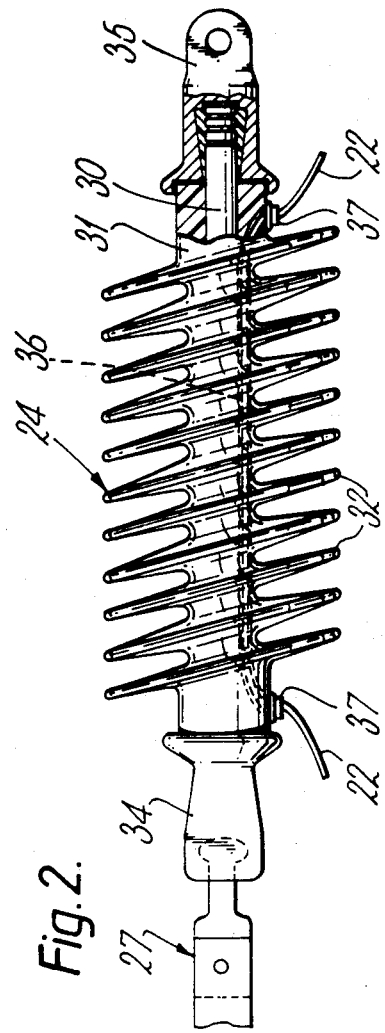

OVERHEAD ELECTRIC AND OPTICAL TRANSMISSION SYSTEMS

This invention relates to overhead electric and optical transmission systems of the kind in which one or more than one overhead electric conductor is freely supported in long lengths between towers, pylons, masts or other upstanding supports mutually spaced along the system, all such supports, for conveninece, being included in the generic term "tower", and in which the overhead electric conductor, or at least one of the overhead electric conductors, includes over at least a part of its length at least one optical guide for use in the communications field adapted for transmission of light.

The invention is especially, but not exclusively concerned with an overhead electric and optical transmission system of this kind in which the overhead electric conductor, or at least one of the overhead electric conductors, has at least one optical guide extending throughout substantially the whole length of the conductor. One such overhead electric conductor is described and claimed in the Complete Specification of our British Pat. No. 1598438 and comprises at least one layer of helically wound bare elongate elements of metal or metal alloy, at least one elongate compartment within and extending throughout the length of the conductor and, loosely housed in the elongate compartment or at least one of the elongate compartments, at least one separate optical fibre and/or at least one optical bundle. In another such overhead electric conductor, an optical guide comprising at least one separate optical fibre and/or at least one optical bundle is helically wound around the conductor throughout substantially the whole of its length. By the expression "optical bundle" is meant a group of optical fibres or a group of fibres including at least one optical fibre and including at least one non-optical reinforcing fibre or other reinforcing elongate member.

The invention is also concerned with an overhead electric and optical transmission system of the aforesaid kind in which the overhead electric conductor, or at least one of the overhead conductors, includes over a part of its length at least one optical guide for use in monitoring a condition of the conductor or of the system of which the conductor forms a part.

In an overhead electric and optical transmission system of the aforesaid kind, it is usually necessary to effect a joint between the optical guides of two overhead electric conductors suspended from a tower, to effect a joint between the optical guides of an overhead electric conductor suspended from a tower and of a cable extending to a sub-station or other location, or to effect a joint between the optical guide of an overhead electric conductor suspended from a tower and ancilliary optical equipment, and, in effecting each such optical guide joint, it is necessary to mechanically secure the or each overhead electric conductor incorporating an optical guide or optical guides to the tower or another substantially rigid support structure of the overhead electric and optical transmission system.

It is an object of the present invention to provide, in an overhead electric and optical transmission system of the aforesaid kind, an improved mechanical connection between an overhead electric conductor and a tower or other rigid support structure.

According to the invention, in the improved mechanical connection, an end of the overhead electric conductor is mechanically secured to and is electrically insulated from the tower or other rigid support structure by at least one elongate tension insulator having at least one throughbore, the optical guide or optical guides of the electric conductor passes or pass from the conductor through the throughbore or throughbores of the tension insulator to an optical guide joint remote from the insulator, and the electric conductor is electrically connected to another electric conductor.

In one embodiment of the invention, the elongate tension insulator associated with the electric conductor preferably comprises an elongate body of substantially rigid electrically insulating material of high tensile strength, e.g. porcelain or glass, which has, mechanically secured to its ends, metal terminal fittings connected to the overhead conductor and to the tower or other structure, which has, at each of a plurality of positions mutually spaced along the length of and integral with the body, and outwardly extending shed or similar projection whereby the creepage path between the ends of the tension insulator is increased, and which has, extending along the body, a central throughbore through which the optical guide or guides passes or pass.

In another embodiment of the invention the elongate tension insulator associated with the overhead electric conductor preferably comprises an elongate load transmitting member of electrically insulating material which has, mechanically secured to its ends, metal terminal fittings connected to the overhead conductor and to the tower or other structure, and, surrounding the load transmitting member, a sleeve of plastics insulating material, e.g. of a cycloaliphatic resin or butyl rubber, which has at each of a plurality of positions mutually spaced along the length of and integral with the sleeve an outwardly extending shed or similar projection whereby the creepage path between the ends of the tension insulator is increased, and which has, extending throughout the length of the wall of the sleeve, at least one throughbore through which the optical guide or guides passes or pass. The elongate load transmitting member of the tension insulator is preferably a rod or tube of resin bonded glass or other inorganic fibre and the metal terminal fittings are preferably compression jointed to the rod or tube.

The or each throughbore of the tension insulator preferably is sealed at each of its ends by a sealing gland through which the or each optical guide passes and which prevents the entry of moisture. Preferably, the optical guide or optical guides is or are loosely housed in the or each throughbore of the tension insulator and, in this case, preferably, also, the or each optical guide is of a length substantially greater than the length of the throughbore and the throughbore may be filled with a water-impermeable medium of a grease-like nature, e.g. petroleum jelly, which will permit the optical guide or guides within the throughbore to move with respect to the tension insulator when the overhead electric conductor to which the tension insulator is secured oscillates or is otherwise flexed. In some circumstances, the water-impermeable medium may be a hardened resinous material in which the optical guide or guides is or are encapsulated.

The overhead electric conductor may be mechanically secured to its associated tension insulator and may be electrically connected to said other electric conductor by any convenient fitting which will not impede passage of the optical guide or optical guides of the conductor into the throughbore or throughbores of the tension insulator but, for this purpose, it is preferred to employ the dead end fitting described and claimed in the Specification of our co-pending British Patent Application Ser. No: 2115621A.

The tension insulator may be mechanically secured to the tower or other structure by a conventional tongue and clevis fitting.

The optical guide or optical guides emerging from the throughbore or throughbores of the tension insulator may be electrically shielded by an earth leakage device electrically connected to the tower or other structure to ensure that any stray currents are conducted to earth.

At the optical guide joint remote from the tension insulator, the optical guide or guides of the electric conductor may be permanently spliced or detachably jointed to the optical guide or optical guides of a second overhead electric conductor mechanically secured to the tower or of a cable extending to a sub-station or other location, or may be permanently or detachably connected to ancilliary optical equipment.

The other conductor to which the electrical conductor is electrically connected may be a downlead or may be another overhead electric conductor mechanically secured to the tower to which the first said electric conductor is mechanically secured and, in this case, preferably the two overhead conductors are electrically connected by a conventional jumper cable.

The invention is further illustrated by a description, by way of example, of three preferred forms of mechanical connection between an overhead electric conductor having a central elongate compartment in which a flexible optical guide is loosely housed and a tower of an overhead electric and optical transmission system of the aforesaid kind, with reference to the accompanying drawings, in which:

FIG. 1 is a side view of a first preferred form of mechanical connection between an overhead electric conductor and the tower;

FIG. 2 is a side view, partly in section and partly in elevation, of a second preferred form of such a mechanical connection;

Figure 3:
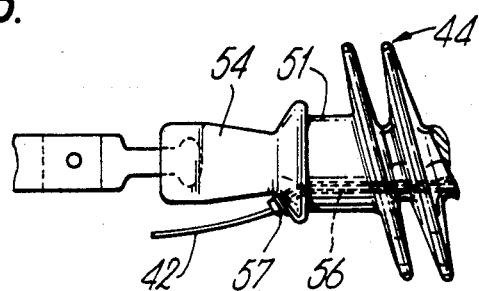
FIG. 3 is a fragmental side view of a modification of the second preferred mechanical connection shown in FIG. 2.

Referring to FIG. 1, an overhead electric conductor 1, which has throughout its length a central elongate compartment in which a flexible optical guide 2 is loosely housed, is mechanically secured to a tower 3 through an elongate tension insulator 4. A tubular metal fitting 5, closed at one end, is compression jointed to the conductor 1 and is mechanically connected to one end of the insulator 4 by a tongue and clevis fitting 7. The other end of the insulator 4 is mechanically connected to the tower 3 by a tongue and clevis fitting 8. Integral with the tubular fitting 5 is a fitting 9 for effecting electrical connection to a jumper cable. The tension insulator 4 comprises a body 11 of porcelain having, at each of a plurality of positions mutually spaced along its length a shed 12 and having, at one end, a metal terminal 14 mechanically connecting the insulator to the tongue and clevis fitting 7 and, at its other end, a metal terminal fitting 15 mechanically connecting the insulator to the tongue and clevis fitting 8. Extending throughout the length of the tension insulator 4 is a central throughbore 16. The optical guide 2 of the conductor 1 passes through an outlet 6 in the tubular fitting 5, throughout the length of the throughbore 16, in which it is loosely housed, and, from the insulator, the optical guide extends to an optical guide joint (not shown). In passing into and out of the throughbore 16, the optical guide 2 passes through a sealing gland 17 which seals the throughbore against entry of moisture.

The mechanical connection shown in FIG. 2 is very similar to that shown in FIG. 1 except for the form of tension insulator employed. Accordingly, those components of the mechanical connection shown in FIG. 2 that are identical to those shown in FIG. 1 are given numerical references greater by twenty than the numerical references of the corresponding components of the mechanical connection shown in FIG. 1. The tension insulator 24 of the mechanical connection shown in FIG. 2 comprises a rod 30 of resin bonded glass fibre to the ends of which metal terminals 34, 35 are compression jointed. The rod 30 is surrounded by a sleeve 31 of butyl rubber which has, at each of a plurality of positions mutually spaced throughout its length, a shed 32. Extending throughout the length of the sleeve 31 is throughbore 36 through which the optical guide 22 passes in its passage from its conductor to an optical guide joint (not shown). The throughbore 36 is sealed at each of its ends by a sealing gland 37 which effects a fluid-tight seal with the optical guide 22.

In the modification shown in FIG. 3 of the mechanical connection illustrated in FIG. 2, the tension insulator 44 is of substantially the same construction as the tension insulator 24 of the mechanical connection shown in FIG. 2 except that the throughbore 56 passes through one terminal 54 along the whole length of the wall of the sleeve 51 and through the terminal (not shown) at the other end of the insulator. As in the case of the insulator 24 of the mechanical connection shown in FIG. 2, each end of the throughbore 56 is sealed by a sealing gland 57 with which the optical guide 42 effects a fluid-tight seal.

Figure 4:
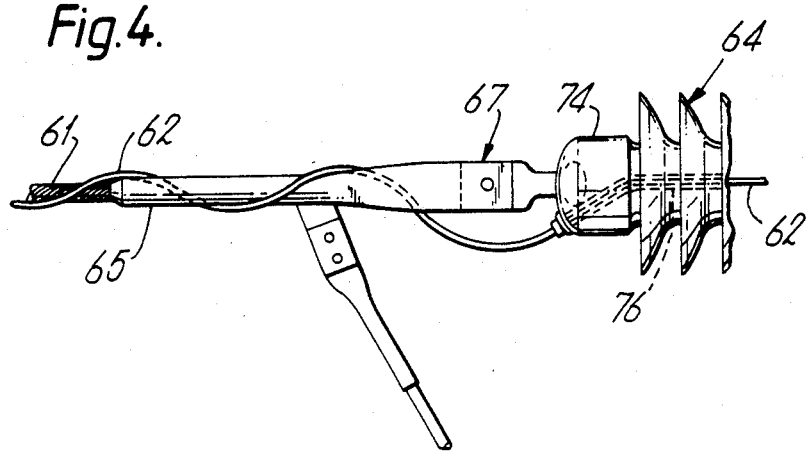
FIG. 4 is a fragmental side view of a third preferred form of such a mechanical connection.

In the third preferred form of mechanical connection shown in FIG. 4, an overhead electric conductor 61 has helically wound around the conductor throughout its length a flexible optical guide 62. The conductor 61 is mechanically secured to a tower (not shown) by a tension insulator 64 of a construction similar to that of the tension insulator 4 shown in FIG. 1. A tubular fitting 65, closed at one end, is compression jointed to the conductor 61 and is mechanically connected to a terminal 74 at one end of the tension insulator 64 by a tongue and clevis fitting 67. The flexible optical guide 62 is helically wound around the tubular fitting 65 and passes into the central throughbore 76 of the insulator 64.

In each of the mechanical connections shown in FIGS. 1 to 4, at the optical guide joint (not shown) the optical guide of the overhead electric conductor may be permanently spliced or det<sub>_</sub>chably jointed to the optical guide of a second overhead electric conductor mechanically secured to the tower or of a cable extending to a sub-station or other location, or the optical guide may be permanently or detachably connected to ancilliary optical equipment. The optical guide joint may or may not be mounted on the tower.

What I claim as my invention is:

1. An overhead electric and optical transmission system of the kind in which at least one overhead electric conductor is freely supported in long lengths between towers and includes over at least a part of its length at least one optical guide for use in the communications field adapted for transmission of light, a mechanical connection between an overhead electric conductor incorporating at least one optical guide and a tower in which an end of the overhead electric conductor is mechanically secured to and is electrically insulated from the tower by at least one elongate tension insulator and the electric conductor is electrically connected to another electric conductor, wherein the elongate tension insultor comprises an elongate body of substantially rigid, electrically insulating material of high tensile strength which has, mechanically secured to its ends, metal terminal fittings connected to the overhead conductor and to the tower, which has, at each of a plurality of positions mutually spaced along the length of and integral with the body, an outwardly extending shed whereby the creepage path between the ends of the tension insulator is increased, and which has, extending along the body, a central throughbore through which the optical guide of the electric conductor passes from the conductor to an optical guide joint remote from the insulator.

2. A mechanical connection as claimed in claim 1, wherein the tension insulator is made of porcelain.

3. A mechanical connection as claimed in claim 1, wherein the tension insulator is made of glass.

4. In an overhead electric and optical transmission system of the kind in which at least one overhead electric conductor is freely supported in long lengths between towers and includes over at least a part of its length at least one optical guide for use in the communications field adapted for transmission of light, a mechanical connection between an overhead electric conductor incorporating at least one optical guide and a tower in which an end of the overhead electric conductor is mechanically secured to and is electrically insulated from the tower by at least one elongate tension insulator and the electric conductor is electrically connected to another electric conductor, wherein the elongate tension insulator comprises an elongate load transmitting member of electrically insulating material which has, mechanically secured to its ends, metal terminal fittings connected to the overhead conductor and to the tower, and surrounding the load transmitting member, a sleeve of plastics insulating material which has, at each of a plurality of positions mutually spaced along the length of and integral with the sleeve, an outwardly extending shed whereby the creepage path between the ends of the tension insulator is increased, and which has, extending throughout the length of the wall of the sleeve, at least one throughbore through which the optical guide of the electric conductor passes from the conductor to an optical guide joint remote from the insulator.

5. A mechanical connection as claimed in claim 4, wherein the elongate load transmitting member of the tension insulator is of resin bonded inorganic fibre and the sleeve is of a cycloaliphatic resin.

6. A mechanical connection as claimed in claim 4, wherein the elongate load transmitting member of the tension insulator is of resin bonded inorganic fibre and the sleeve is of butyl rubber.

7. A mechanical connection as claimed in claim 1 or 4, wherein the throughbore of the tension insulator is sealed at each of its ends by a sealing gland through which the optical guide passes.

8. A mechanical connection as claimed in claim 1 or 4, wherein the optical guide is loosely housed in, and is of a length substantially greater than the length of, the throughbore of the tension insulator.

9. A mechanical connection as claimed in claim 1 or 4, wherein the optical guide is loosely housed in, and is of a length substantially greater than the length of, the throughbore of the tension insulator and wherein the throughbore is filled with a water-impermeable medium of a grease-like nature which will permit the optical guide within the throughbore to move with respect to the tension insulator when the overhead electric conductor is flexed.

10. A mechanical connection as claimed in claim 1 or 4, wherein the throughbore of the tension insulator is filled with a water-impermeable medium comprising a hardened resinous material in which the optical guide is encapsulated.

11. A mechanical connection as claim in claim 1 or 4, wherein the optical guide emerging from the throughbore of the tension insulator is electrically shielded by an earth leakage device electrically connected to the tower.

* * * * *